United States Patent Office 3,192,272
Patented June 29, 1965

3,192,272
TRIBROMINATED DIALKYL BENZENES
Arthur A. Asadorian, Midland, Mich., assignor to The Dow Chemical Company, Midland, Mich., a corporation of Delaware
No Drawing. Filed Dec. 27, 1960, Ser. No. 78,278
3 Claims. (Cl. 260—659)

This invention relates to new ring-tribrominated dialkylbenzene mixtures. More particularly, it relates to mixtures of isometric ring-tribrominated ethyltoluenes and mixtures of isometric ring-tribrominated diethylbenzenes, these mixtures having properties making them of value as functional fluids, such as gauge fluids, heat transfer fluids, torque converter fluids, and the like.

Such functional fluids require particular combinations of physical and chemical properties according to the application for satisfactory performance. For example, properties which are especially values and necessary in a gauge fluid include low volatility, high density, and low freezing point. Other desirable properties are high chemical and thermal stability, low flammability, or better, non-flammability, and low chemical reactivity. It is apparent that few fluids possess all, or even most of these properties to a satisfactory degree, and of these few, many are ruled out from extensive use by their high cost. Gauge fluids now in use are deficient to some extent in one or more of the necessary properties and there is constant demand for fluids which are improved in one respect or another in order to meet more exacting requirements.

I have found that mixed isomeric ring-tribrominated ethyltoluenes and mixed isomeric ring-tribrominated diethylbenzenes obtained by bromination under suitable conditions of meta-rich ethyltoluene mixtures and meta-rich diethylbenzene mixtures have physical and chemical properties making them particularly valuable as gauge fluids, heat transfer fluids, torque converter fluids, and other such functional fluids. These new isomeric mixtures are represented by the general formula

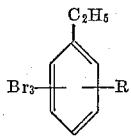

wherein R is predominantly, that is, in at least 50% proportion, meta to the ethyl radical and is either methyl or ethyl. They are characterized by their unusually low freezing points which lie below —20° C. It is particularly unexpected to find that these isomeric mixtures are liquids with very low freezing points, for the closest known compounds, the ring-tribrominated xylenes, all have melting points in the range 85–105° C., as reported in the literature. These mixtures have high densities, their specific gravities at 25/25° C. falling in the approximate range 1.87–2.02. They are colorless, highly refractive liquids with refractive indexes $(n_D{}^{25})$ ordinarily in the range 1.60–1.64.

These isomeric mixtures are obtained by brominating commercially available ethyltoluene and diethylbenzene mixtures containing at least 50% of the meta isomers. These dialkylbenzene mixtures may be represented by the general formula

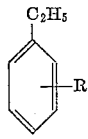

wherein R is predominantly meta to the ethyl radical and is methyl or ethyl. The bromination is carried out under conditions favoring ring substitution, that is, at temperatures below about 50° C. and in the presence of an effective amount of a ring-bromination catalyst. About 1–3% by weight of ferric chloride based on the hydrocarbon has been found suitable. The bromination is accomplished by adding liquid bromine directly to the dialkylbenzene mixture. Customarily, no solvent is used for the bromination reaction although an inert solvent such as a chlorinated aliphatic hydrocarbon may be used. It is advantageous to brominate with less than the theoretical proportion of three moles of bromine to one mole of dialkylbenzene in order to avoid formation of substantial quantities of tetrabrominated products which are relatively high-melting solids. From about 2.0 to 3.0 moles of bromine per mole of dialkylbenzene is the preferred ratio. The reaction product is washed with water and preferably with an aqueous alkaline solution to remove dissolved hydrogen bromide and the acidic catalyst, and the tribrominated fraction is separated by distillation. The lower-boiling dibrominated fraction may be recycled to the bromination process.

These tribrominated isomeric mixtures typically have extremely low freezing points and pour points, and high specific gravity. The ring-tribrominated ethyltoluene mixtures are characterizer by a freezing point below about —20° C. and a specific gravity at 25/25° C. in the range 1.98–2.02. Their refractive index $(n_D{}^{25})$ is usually in the range 1.61–1.64. The ring-tribrominated diethylbenzene mixtures are similarly characterized by a freezing point below about —20° C. and a specific gravity at 25/25° C. in the range 1.87–1.92. Their refractive index $(n_D{}^{25})$ is usually in the range 1.60–1.62.

Both the ring-tribrominated ethyltoluenes and the ring-tribrominated diethylbenzenes are further characterized by being chemically inert and unreactive and of low toxicity, thereby presenting no particular handling or storage problems.

They are also characterized by low volatility, having boiling points in excess of 300° C. at atmospheric pressure. They are thermally stable to about 315° C. and are nonflammable. Their advantage as functional fluids lies in these desirable properties and the fact that these substances are relatively cheap and easy to prepare. Their properties make them useful also as components of mixed functional fluids to which mixtures are thereby imparted improved properties such as increased density, lower flammability, and the like.

Examples 1 and 2 illustrate a preferred method of preparing these new isomeric mixtures.

Example 1

Into a glass flask fitted with a stirrer and a reflux condenser vented through a scrubber was put 1285 g. ethyltoluene consisting of 62% m-ethyltoluene and 38% p-ethyltoluene, only a trace of o-ethyltoluene being present, and 20 g' of anhydrous ferric chloride as a bromination catalyst. To this stirred mixture was added 4620 g. liquid bromine over a period of 8½ hours at a temperature of 25–26° C. After the resulting reaction mixture had stood at room temperature for a few hours, it was washed, first with cold water, then with cold dilute aqueous sodium carbonate solution. The washed product was a yellow oil, weight 3350 g. It was distilled under reduced pressure through a Vigreux column to obtain 51.3% of the still load or 1718 g. of a colorless tribrominated fraction which had the following properties: Boiling range at 25 mm., 190–198° C.; pour point —33° C.; first crystals form at —21° C.; specific gravity 25/25° C., 2.00; and refractive index, $n_D^{25}$ 1.6257. The fraction was found to have no flash or fire point up to its decomposition temperature of about 315° C. Bromine analysis showed 100.3% as tribromoethyltoluene. Infrared examination indicated no side chain bromination.

*Example 2*

A diethylbenzene mixture containing 54% m-diethylbenzene and 23% each of the ortho and para isomers was brominated at 19–22° C. by a procedure similar to that described in Example 1. A tribromodiethylbenzene fraction was separated from the reaction mixture by distillation. The product was a clear colorless oil with the following properties: Boiling range at 25 mm., 191–217° C.; pour point −45° C.; specific gravity 25/25° C. 1.898; and refractive index $n_D^{25}$ 1.6121. The fraction had no flash or fire point up to its decomposition temperature of about 315° C. Bromine assay showed 100.0% as tribromodiethylbenzene. Infrared examination indicated no side chain bromination.

In order to have a tribrominated product with a sufficiently low freezing point, it is necessary that at least 50% of the product be the tribrominated m-ethyltoluene or m-diethylbenzene as the case may be. For example, ring bromination of o-ethyltoluene produced tribromo-o-ethyltoluene fractions which were white solids having melting points in the range 40–60° C.

I claim:
1. A normally liquid mixture of compounds having the general formula

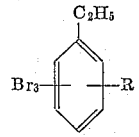

wherein R is predominantly meta to the ethyl radical and is an alkyl radical containing 1 to 2 carbon atoms, said mixture being characterized by having a specific gravity at 25°/25° C. in the range 1.87–2.02 and a freezing point below about −20° C.

2. A mixture as described in claim 1 wherein R is methyl, said mixture having a specific gravity at 25°/25° C. in the range 1.98–2.02 and a freezing point below about −20° C.

3. A mixture as described in claim 1 wherein R is ethyl, said mixture having a specific gravity at 25°/25° C. in the range 1.87–1.92 and a freezing point below about −20° C.

References Cited by the Examiner
UNITED STATES PATENTS

| | | | |
|---|---|---|---|
| 2,257,903 | 10/41 | Dreisbach | 260—650 |
| 2,659,760 | 11/53 | Frevel et al. | 260—650 |
| 3,020,300 | 2/62 | Schnabel | 260—650 |

LEON ZITVER, *Primary Examiner.*

ALPHONSO D. SULLIVAN, *Examiner.*